Feb. 2, 1971  E. MARIANESCHI  3,559,277
WELDING PROCESS FOR HIGH-HARDENABILITY STEEL
Filed Nov. 15, 1968
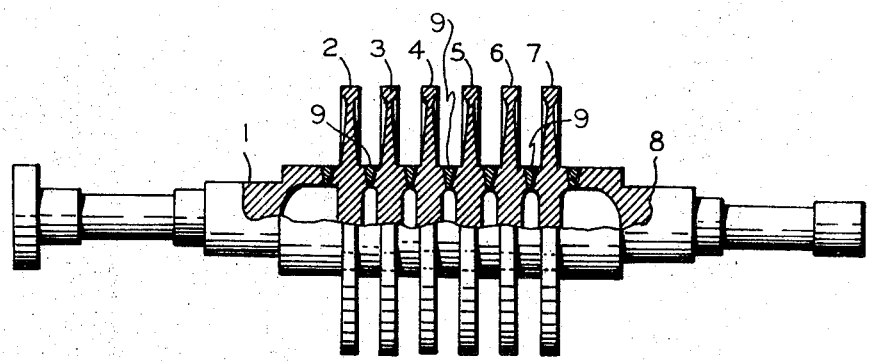
FIG.1
   
FIG.2A   FIG.2B   FIG.2C   FIG.2D
INVENTOR
EDMONDO MARIANESCHI
BY Wenderoth, Lind & Ponack

United States Patent Office 3,559,277
Patented Feb. 2, 1971

3,559,277
WELDING PROCESS FOR HIGH-HARDENABILITY STEEL
Edmondo Marianeschi, Rome, Italy, assignor to Terni Società per l'Industria e l'Elettricita, S.p.A., Rome, Italy
Continuation-in-part of application Ser. No. 338,979, Jan. 20, 1964. This application Nov. 15, 1968, Ser. No. 776,213
Claims priority, application Italy, Feb. 1, 1963, 1,743/63
Int. Cl. B23k *31/02*
U.S. Cl. 29—471.1  1 Claim

ABSTRACT OF THE DISCLOSURE

A process for treating a high duty not readily weldable steel to provide it with a weldable surface. The surface is first buttered with a weldable coating and then the buttered layer is hot worked while plastic.

---

This application is a continuation-in-part of my application Ser. No. 338,979 filed Jan. 20, 1964, and now abandoned entitled Steel Welding Process, Particularly as Regards Self-Hardening Steel, and Relevant Product.

This invention relates to a welding process for steel of high hardenability and the manufacture of welded components.

The difficulty of welding steel of high hardenability is well known. For a long time the process of "buttering" such steel to make welding possible has been well known. This process consists of applying a metal layer of a suitable composition in contact with the surfaces of the base metal to be joined together, so as to facilitate the subsequent welding to the buttered layer. While satisfactory for some steel of low hardenability, the efficiency of this process is restricted by the fact that when the base metal has a hardenability exceeding certain limits, micro-cracks and brittle structures may form in the transition area (base metal-buttered metal), thus endangering the efficiency of the "buttering" and rendering impossible the satisfactory manufacture of a welded component in high tensile steels, i.e. high hardenability steels.

One of the objects of the present invention is to overcome this difficulty.

According to the present invention there is provided the process of treating a high duty not readily weldable steel to provide it with a weldable surface which consists in the steps of first buttering the surface with a weldable coating and then hot working the buttered layer while plastic.

An object of the invention is to provide a welding method for joining parts of machines for heavy duty and thus relates to structural steels.

The process may have many applications, but as an example the process as described can be applied to the manufacture of components for steam turbine rotors, as referred to in the accompanying illustrations.

FIG. 1 shows a side elevation, partially in section, of a turbine rotor.

FIGS. 2A to 2D show the various stages of manufacture of one of the rotor components represented in FIG. 1.

In FIG. 1 the rotor shaft is shown consisting of two shaft-ends 1 and 8, and disc components numbered from 2–7 joined by the annular welds shown at 9 in FIG. 1.

The rotor components (shaft-ends and discs) to be fabricated by welding are made of a steel having the following indicative chemical composition by weights: C 0.15–0.40%; Ni≦4.5%; Cr≦3.5%; Mo≦1.5%; V≦0.6%; W≦1%; Si≦1.5%; Mn≦2%.

The steel having the above mentioned composition is not readily weldable. The composition of the material used for buttering has the same range except for the carbon content which must be less than 0.30%. In the example from a real full scale experiment herein described the base material had the following composition: C=0.27%; Ni=3.68%; Cr=1.65%; Mo=0.52%; V=0.13%; W=0.58%; Si=0.22%; Mn=0.58%; and the buttered layer had the following chemical composition: C=0.05%; Ni=2.60%; Cr=0.68%; Mo=0.52%; V=traces; W=traces; Si=0.22%; Mn=0.58%.

The second steel is clearly weldable, the first steel is not weldable. As can be seen, the chemical compositions of the two steels come within the range given above.

Design requirements often entail such high mechanical properties in the discs that it is necessary to use high hardenability steels, with low or very bad welding properties. By the application of the process the limitations implied by the use of such steels can be overcome by the following procedure:

FIG. 2A shows the disc upon completion of the initial forging.

FIG. 2B on the area of the annular projections from which the chamfers will be formed, and at a pre-heating temperature, a suitable thickness of buttering weld is deposited using an electrode with low hardenability but able to meet the mechanical properties required. The strength specified in the area of the welded joint is usually lower than the maximum strength required in the peripheral zone of the discs. The pre-heating temperature for buttering ranges from 100 to 400° C. The appropriate preheating temperature is either predictable or readily ascertainable empirically.

FIG. 2C illustrates the disc after "buttering." The disc was heated to a forging temperature higher than the steel recrystallization temperature in the range 850° C. to 1350° C. and the "buttered" area was forged by hammer, press or rolling mill. After finishing this operation the whole disc was heat treated by quenching from austenization temperature and tempered at a temperature below 700° C.

FIG. 2D, the chamfered area and the remaining parts were then finish machined so as to enable the final assembly for welding to be carried out. The chamfered areas are thus composed of a buttered material, consolidated by forging, which perfectly match the base material, which is itself a forging. Finally the discs were assembled using the normal arc welding processes, either manual or flux automatic welding. After finishing the final welding, the whole disc is stress relieved at a temperature below 700° C.

An electrode having a composition similar to that of the base metal, but having a lower hardenability, is used so as to ensure the necessary strength.

The invention involves a particular kind of buttering characterized by the hot working of the buttered layer while plastic (above recrystallization temperature) consisting in forging, pressing or rolling operation or the like. The thickness of the buttered layer is greater than 2 mm.

It has been found that with the process above described the step of forging causes the micro-cracks to be welded by compression and the general homogeneity obtained results generally in the removal of all defects and brittle structures, thus giving a better cohesion with the base metal.

I claim:

1. A method of making a turbine rotor in the form of a plurality of weldably interjoined adjacently disposed rotor disc elements of high hardenability not readily weldable steel welded to and intermediate a pair of shaft ends of readily weldable steel comprising the steps of:

(1) providing said disc elements and said shaft ends at the interjoining welding junction areas with a layer of an easily weldable steel buttered thereon;

(2) forging each of said buttered layers while in a hot plastic state at a temperature higher than the steel recrystallization temperature to form predetermined shaped junction areas of the buttered layers to facilitate their subsequent weldable interjoining;

(3) quenching the buttered disc elements and shaft ends from austenization temperature, and tempering same at a temperature below 700° C.;

(4) welding said disc elements adjacently to one another at the buttered junction areas to form a disc assembly; and (5) welding said disc assembly to and intermediate the pair of shaft ends via their respective butter junction areas to form the turbine rotor.

References Cited

UNITED STATES PATENTS

| 2,237,716 | 6/1941 | Spaulding | 29—487 |
| 2,709,295 | 5/1955 | Chyle | 29—497X |
| 2,759,249 | 8/1956 | Eberle | 29—497X |
| 2,955,353 | 10/1960 | Gross | 29—492X |
| 3,308,531 | 3/1967 | Wasserkampt | 29—492X |

JOHN F. CAMPBELL, Primary Examiner

V. A. DiPALMA, Assistant Examiner

U.S. Cl. X.R.

29—475, 487, 492